(12) United States Patent
Parker et al.

(10) Patent No.: US 8,893,174 B2
(45) Date of Patent: Nov. 18, 2014

(54) METHOD AND SYSTEM FOR PROVIDING CUSTOMIZED MEDIA CONTENT

(75) Inventors: Benjamin James Parker, Overland Park, KS (US); Rick Hulett, Hood River, OR (US); Brian Michael Huey, Kansas City, MO (US); Randolph Keith Hiser, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1476 days.

(21) Appl. No.: 10/319,985

(22) Filed: Dec. 16, 2002

(65) Prior Publication Data

US 2004/0117828 A1 Jun. 17, 2004

(51) Int. Cl.
| | |
|---|---|
| *H04N 7/10* | (2006.01) |
| *H04N 21/643* | (2011.01) |
| *H04N 21/6405* | (2011.01) |
| *H04N 21/442* | (2011.01) |
| *H04N 7/173* | (2011.01) |
| *H04N 21/472* | (2011.01) |
| *H04N 21/81* | (2011.01) |
| *H04N 21/2668* | (2011.01) |
| *H04N 21/258* | (2011.01) |
| *H04N 21/2381* | (2011.01) |

(52) U.S. Cl.
CPC ... *H04N 21/44222* (2013.01); *H04N 21/64322* (2013.01); *H04N 21/6405* (2013.01); *H04N 7/17318* (2013.01); *H04N 21/47202* (2013.01); *H04N 21/812* (2013.01); *H04N 21/2668* (2013.01); *H04N 21/25891* (2013.01); *H04N 21/2381* (2013.01)
USPC .......................................................... 725/34

(58) Field of Classification Search
USPC .......................................................... 725/34
See application file for complete search history.

(56) References Cited

U.S. PATENT DOCUMENTS

| | | | | |
|---|---|---|---|---|
| 5,383,015 | A | 1/1995 | Grimes | |
| 5,977,964 | A * | 11/1999 | Williams et al. | 715/721 |
| 2001/0010095 | A1* | 7/2001 | Ellis et al. | 725/44 |
| 2002/0026496 | A1* | 2/2002 | Boyer et al. | 709/218 |
| 2002/0054087 | A1 | 5/2002 | Grimes et al. | |
| 2002/0055876 | A1* | 5/2002 | Gabler | 705/14 |
| 2002/0124250 | A1* | 9/2002 | Proehl et al. | 725/32 |
| 2002/0144258 | A1 | 10/2002 | Kitsukawa | |
| 2002/0147984 | A1* | 10/2002 | Tomsen et al. | 725/109 |

(Continued)

FOREIGN PATENT DOCUMENTS

| | | |
|---|---|---|
| WO | WO 02-28006 A2 | 4/2002 |
| WO | WO-0228006 A | 4/2002 |
| WO | WO 2004-062289 A1 | 7/2004 |

OTHER PUBLICATIONS

Publication with International Search Report prepared by the European Patent Office, International Searching Authority for PCT International Patent Application No. PCT/US2003/034277, mailed Jun. 4, 2004, 27 pages.

*Primary Examiner* — Brian T Pendleton
*Assistant Examiner* — Olugenga Idowu
(74) *Attorney, Agent, or Firm* — Swanson & Bratschun, L.L.C.

(57) ABSTRACT

The invention is a method and system for customizing media content distributed by a multicast network based on a stored user profile. A new high quality video distribution method is disclosed. A new system supporting targeted, interactive advertising is taught. The tracking of media content consumed in the home is enabled. Media content producers are provided with a new connection to media content consumers. Unwanted media channels are no longer distributed to a customer.

31 Claims, 3 Drawing Sheets

(56) References Cited

U.S. PATENT DOCUMENTS

| | | | |
|---|---|---|---|
| 2002/0152474 A1* | 10/2002 | Dudkiewicz | 725/136 |
| 2003/0061611 A1* | 3/2003 | Pendakur | 725/46 |
| 2003/0088876 A1* | 5/2003 | Mao et al. | 725/91 |
| 2003/0122878 A1* | 7/2003 | Schlarb et al. | 345/826 |
| 2003/0151621 A1* | 8/2003 | McEvilly et al. | 345/744 |
| 2003/0169724 A1* | 9/2003 | Mehta et al. | 370/352 |
| 2005/0028190 A1* | 2/2005 | Rodriguez et al. | 725/22 |
| 2005/0028208 A1* | 2/2005 | Ellis et al. | 725/58 |

* cited by examiner

METHOD AND SYSTEM FOR PROVIDING CUSTOMIZED MEDIA CONTENT

CROSS-REFERENCE TO RELATED APPLICATIONS

Not applicable

STATEMENT REGARDING FEDERALLY SPONSORED RESEARCH OR DEVELOPMENT

Not applicable.

TECHNICAL FIELD

The present invention relates to providing customized media and, more particularly, to a method for using a multicast network to deliver media entertainment and advertising to an end user based on information contained in a user profile.

BACKGROUND OF THE INVENTION

The proliferation of television channels of every nature provided by content providers, such as satellite TV and cable TV companies, to subscribers has become more of a burden than an asset. The average subscriber is forced to wade through sometimes hundreds of channels to find and view a handful of preferred channels. Considering that Americans watch an average of between 2 and 5 hours of TV per day, the time spent "channel surfing" can be considerable. Forcing customers to pay for unwanted and unviewed channels is, perhaps, even more of an affront than the time they waste browsing through them. It is desirable to offer a subscriber only the channels [s]he is interested in.

Another disadvantage of the television-viewing systems as they exist today is the unidirectional flow of information. Pay-per-view technologies, which capture a minute amount of customer input, have existed in one form or another for some time. It is desirable to be able to receive a significant amount of customer input to include enabling interactive communication and collecting user preferences among other things.

Television (including CATV, satellite, web-casts, pay-per-view programming, etc.) advertising comprises a significant portion of the television-viewing experience. Advertising executives spend a great deal of time and money creating effective and targeted advertising campaigns. Even still, much of their effort is wasted on disinterested consumers. Advertising to interested consumers is a more effective use of advertising resources. It is desirable to use recent advances in communications technology to improve the effectiveness of advertising. Other business methods have successfully harnessed new technologies for the purpose of increasing the effectiveness of advertising such as Engle et al. who teaches an electronic coupon distribution system in U.S. Pat. No. 5,907,830.

The modern communications boom can trace its roots to the 1870's following the issue of U.S. Pat. No. 174,465 to A. G. Bell, which teaches a method of, and an apparatus for transmitting vocal or other sounds telegraphically. The first telephone company quickly followed and, since that time, the American telephone system has become reliable and widespread. Cable and satellite television services emerged 100 years later but are not as widely available as telephone service. It is desirable to provide media to customers over Plain Old Telephone System (POTS) communication lines, especially where cable and satellite television transmission is unavailable. Areas without cable television service or satellite television service typically have limited reception of traditional broadcast television signals. In addition, in areas where many distribution systems of media (broadcast television and radio, cable television and stereo, satellite television and stereo) are available to a customer, no system exists to supply video-on-demand directly to a customer's media-rendering system. Currently, customers must wait until a time specified by the content provider or content distributor to receive the desired media content.

SUMMARY OF THE INVENTION

The present invention solves at least the above problems by providing a system and method for customizing the media content delivered to a customer's media rendering system. Offering several practical applications in the technical arts, the present invention enables the transmission of high quality media to a multitude of customers using a multicast network and Plain Old Telephone System (POTS) lines. As used herein, "POTS" contemplates includes all DSL-capable lines including the many flavors of DSL (HDSL, ADSL . . . ) Additionally, the present invention reduces time spent traversing unwanted television channels, creates a new way for media content producers to establish a connection with consumers, and enables more particular tracking of a customer's media consumption.

The present invention includes a method for providing a customized-media-content-delivery system. Media content, such as the media content broadcast by a satellite television company, is received from a content provider or a content producer, prepared for transmission over a multicast network, and distributed to a specific customer based on that customer's user profile.

The present invention also provides a system that expands the mechanisms available to deliver common consumer media channels to customers. The system includes a media-content-receiving component for receiving raw media content from a content provider or a content producer. The system also includes a transcoder for converting the received, raw media content into an Internet-usable format. A video server operationally controls the customized-media-content-delivery system based on user profiles stored in a user-profile database. The system further includes a multicast network for enabling communication between the transcoder, the user-profile database, the video server, and a customer's media-rendering system.

In this way, a customized-media-content-delivery system expands the media-distribution techniques currently available and introduces new and innovative business methods to offer solutions to common problems found in the prior art.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
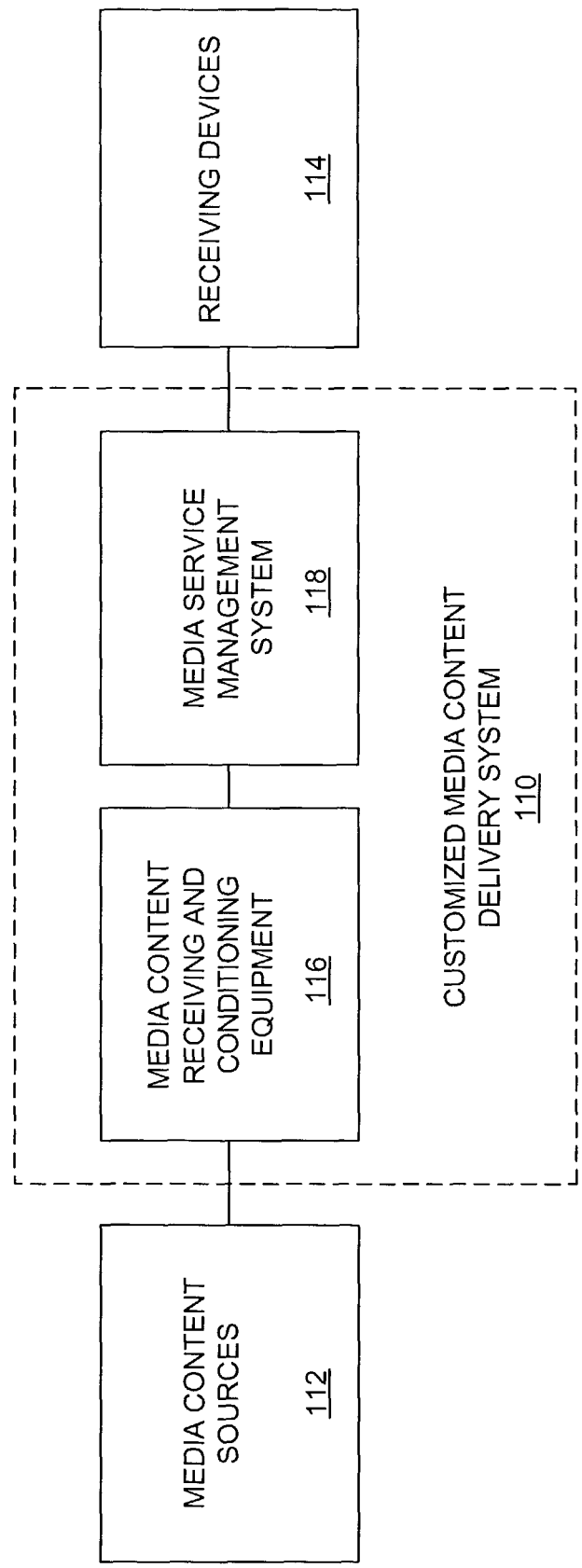
FIG. 1 is a high-level block diagram of a system suitable for implementing a customized-media-content-delivery system.

The present invention provides a new and useful system for delivering high quality media to a customer's media rendering system, such as a television. The customized-media-content-delivery system (CMCDS) can offer a customer more media selections while communicating far less information than the prior art. The CMCDS can send a customer only the media content specifically requested. The present invention can be implemented on DSL-enabled POTS lines and is able to provide video-on-demand. The present invention also accepts user input, which contemplates and enables a host of additional applications such as games, interactive advertising, etc. Those of ordinary skill in the art will be able to make and use the invention according to the disclosure hereof.

Acronyms and Shorthand Notations

Throughout the disclosure of the present invention, several acronyms and shorthand notations are used to aid in the understanding of certain concepts pertaining to the associated system and services. These acronyms and shorthand notations are solely intended for the purpose of providing an easy methodology of communicating the ideas expressed herein, and are in no way meant to limit the scope of the present invention. The following is a list of these acronyms:

| | |
|---|---|
| CATV | Cable TeleVision |
| CMCDS | Customized-Media-Content-Delivery System |
| DSL | Digital Subscriber Line |
| DSLAM | Digital Subscriber Line Access Multiplexer |
| ITU | International Telecom Union |
| PHMS | Personal Hospitality Management System |
| MCRCE | Media Content Receiving and Conditioning Equipment |
| MSMS | Media Service Management System |
| NTSC | National Television System Committee |
| POTS | Plain Old Telephone System |
| RAM | Random Access Memory |
| ROM | Read-Only Memory |
| TCP/IP | Transmission Control Protocol/Internet Protocol |

TCP/IP Transmission Control Protocol/Internet Protocol

Further, various telecom technical terms are used throughout this disclosure. A definition of such terms can be found in: H. Newton, Newton's Telecom Dictionary, 18th Updated and Expanded Edition (2002). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above cited reference.

The present invention will be described more fully with reference to the accompanying figures where exemplary embodiments of the invention are shown. The present invention should not be construed as limited to those embodiments. Rather, the described embodiments are illustrative in nature.

As one skilled in the art will appreciate, the present invention may be embodied as, among other things: a method, a data-communications system, or computer-program product. Accordingly, the present invention may take the form of a hardware embodiment, a software embodiment, or an embodiment combining software and hardware.

Computer-readable media include both volatile and non-volatile media, removable and nonremovable media and contemplates media readable by a database, a switch, and various other network devices. By way of example, and not limitation, computer-readable media may comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to: RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices.

Communications media typically embody computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communication media include: wired media, such as a wired network or direct-wired connection, and wireless media such as acoustic, infrared, radio, microwave, spread-spectrum, and other wireless media technologies. Combinations of the above are included within the scope of computer-readable media.

Figure 2:
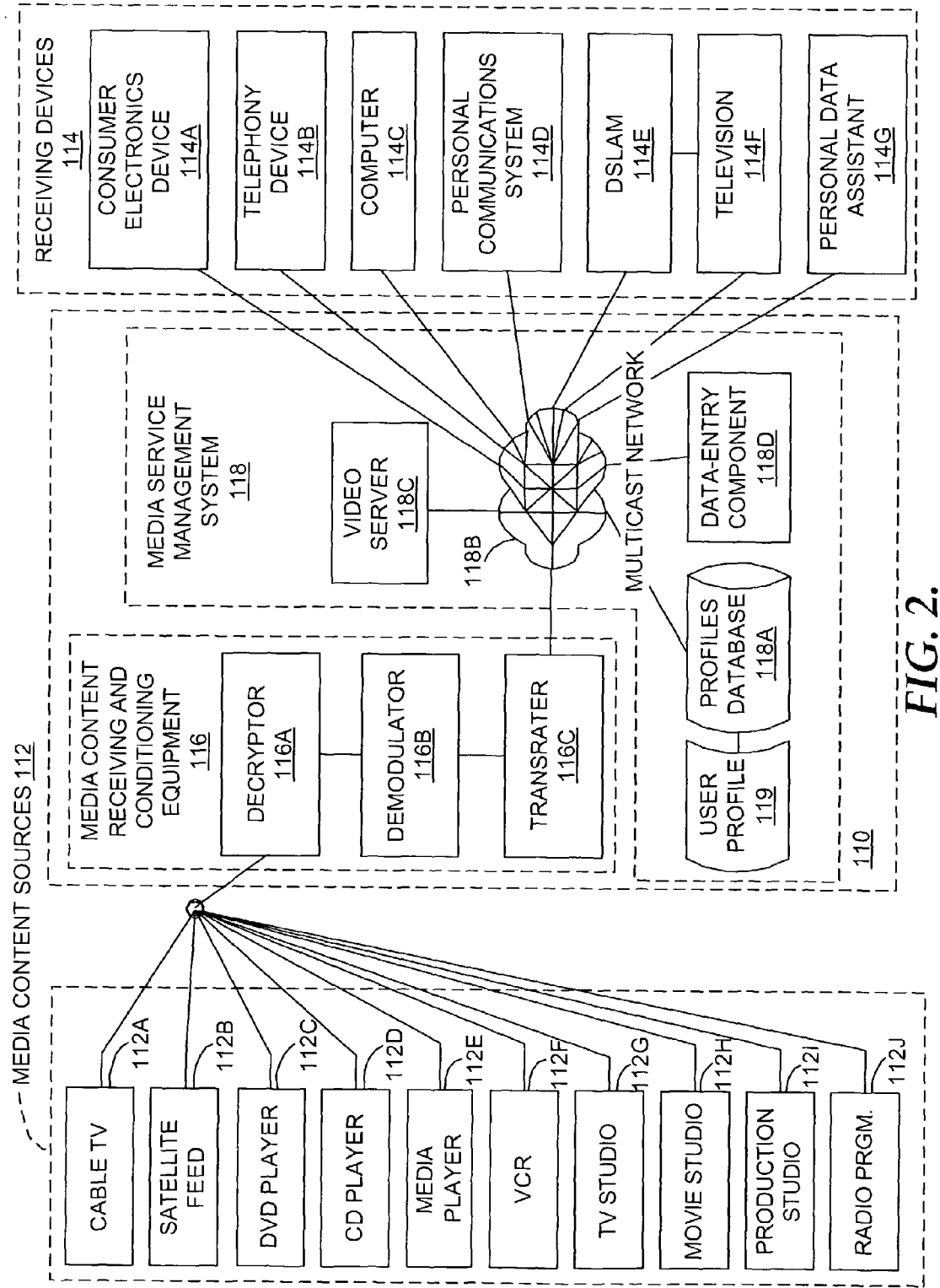
FIG. 2 is more detailed block diagram of a system suitable for implementing customized-media-content-delivery system.
Figure 3:
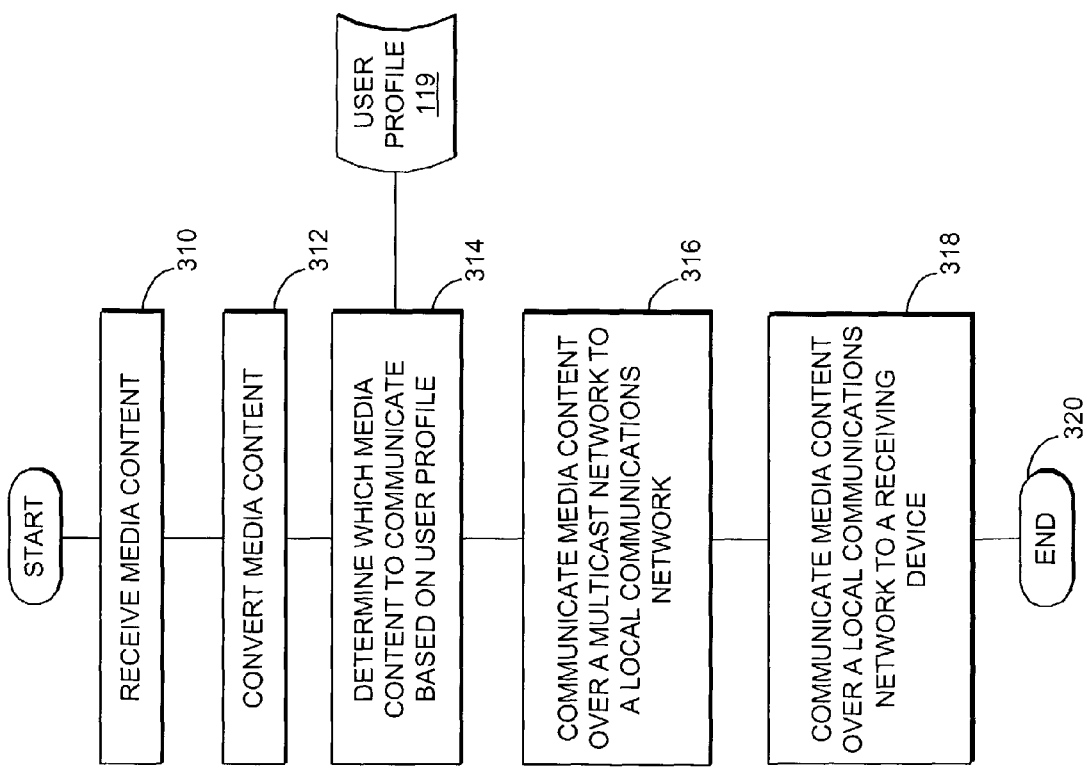
FIG. 3 is a block diagram depicting a method for delivering customized media content.

Referring to FIGS. 1 & 2, the present invention is a system and method for implementing a customized-media-content-delivery system (CMCDS) 110. FIG. 1 is a high level block diagram of a system suitable for implementing the present invention. FIG. 2 is a more detailed block diagram of the same. FIG. 1 depicts CMCDS 110 interfacing with typical media content sources 112 and receiving devices 114. CMCDS 110 comprises the media content receiving and conditioning equipment (MCRCE) 116 and the media service management system (MSMS) 118. CMCDS 110 delivers all forms of media—data, audio, and visual—in a network-compatible format.

Preferably, the media information and data is communicated as Internet Protocol (IP) packets. One skilled in the relevant art would appreciate the array of protocols that would be acceptable, not limited to a Transmission Control Protocol/Internet Protocol (TCP/IP), a File Transfer Protocol (FTP) a Hypertext Transfer Protocol (HTTP), and an International Telecom Union (ITU) protocol. The media information could also be sent in a proprietary protocol or any other protocol that can be used in a computer network. In addition to media content, other data can also be communicated over MCDS 118.

Media content sources 112 communicate raw media content to MCRCE 116. Raw media content is media content that has not yet been conditioned for transmission over a network. This raw media content will be distributed by system 110 to various receiving devices 114. In one embodiment, media content sources 112 include traditional media content providers such as cable television and satellite television companies. Many sources suitable for raw media content exist including raw media content supplied by cable TV 112A, a satellite feed 112B, a Digital Versatile Disc (DVD) player 112C, a Compact Disc (CD) player 112D, a media player 112E, a Video Cassette Recorder (VCR) 112F, a TV studio 112G, a movie studio 112H, a production studio 112I, and a radio program 112J. Content is not limited to an origin. Accordingly, content can be aggregated from international sources and presented based on a user profile and it contents. As would be understood by one skilled in the art, any device capable of transmitting media via electrical, electronic, electromagnetic, or optical signals is an acceptable raw media content source and is contemplated within the scope of media content sources 112.

MCRCE 116 receives raw media content from media content sources 112 and converts the information into a network-compatible format. MCRCE 116 communicates the conditioned media content to MSMS 118. MCRCE 116 can also be called a transcoder. MCRCE 116 employs various types of communication-conditioning equipment including a decryptor 116A, a demodulator 116B, and a transrater 116C. Decryptor 116A, demodulator 116B, and transrater 116C are used to convert raw media content from many different raw media content sources 112 into a network-compatible format. Decryptor 116A removes the encryption or "scrambling" of the incoming signal. Demodulator 116B removes the carrier wave from the incoming signal, thus leaving only the original signal, before it was modulated with a higher frequency signal in preparation for transmission. Preferably, the data is communicated via an Asynchronous Serial Interface (ASI) stream feeding into transrater 116C. The data is conditioned and transferred from demodulator 116B in a form that can be converted to data packets that will be communicated over a network. Transrater 116C can receive incoming data at varying rates and transmit outgoing data at a desired, selectable rate.

MSMS 118 is the control center and decision-making mechanism in CMCDS 110. MSMS 118 routes media content to the appropriate receiving device in an appropriate format based on stored user-profile information. MSMS 118 can use its routing and decision-making abilities to selectively transmit certain media content to specific destinations among receiving devices 114. Thus, access to the available media content is selectively limited based on a user profile 119.

In one embodiment, MSMS 118 receives all of the media content regularly available from a cable television company. MSMS 118 then communicates only the portion of the media content to a receiving device. Thus, the customer receives only the media desired to which he is entitled. In this way, MSMS 118 delivers media content while offering a customer a familiar method of doing business, such as selecting a set of channels for a certain length of time.

In another embodiment, MSMS 118 receives all of the media content regularly available from a cable television company. MSMS 118 also receives and stores information from a customer requesting only media content associated with certain cable television channels. MSMS 118 then communicates only the media content associated with the requested cable television channels to the customer's receiving device. In this way, the CMCDS 110 provides a convenient service to a customer by not communicating media content associated with television channels that are not desired by the customer. This embodiment requires fewer resources to implement since only a portion of the total available media content is communicated.

MSMS 118 includes a profiles database 118A, a multicast network 118B, a video server 118C, and a data-entry component 118D. Profiles database 118A stores at least one user profile 119 that contains customer information. In a practical implementation, profiles database 118A would store thousands or millions of user profiles. User profile 119 could be associated with an individual or with a group, such as a family, church, school or other organization. In addition to information such as account activity, billing address and activity logs, the customer information stored in user profile 119 includes user preferences, such as media preferences. Exemplary media preferences include television-channel preferences, language preferences; genre preferences, service-duration preferences, viewing preferences, topic preferences, ratings preferences, actor preferences, style preferences, era preferences, artist preferences, protocol preferences, and format preferences. Television-channel preferences can be set such that channels appear in the order stored in the user profile database The data packets from transrater 116C are communicated over the multicast network 118B. Multicast network 118B has a number of multicast routers. Multicast routers are able to send data from one source to multiple destinations. Thus, many receiving devices 114 can receive the contents of media packets transmitted from MCRCE 116 to multicast network 118B.

Video server 118C stores media content received from MCRCE 116 via multicast network 118B. Media content may also be stored on media server 118 from any other sources, including the Internet and a media player such as a DVD player or VCR. Any method that accomplishes this objective is suitable for the present invention. In addition to storing media, video server 118C exercises control over CMCDS 110. In one embodiment, for every customer, video server 118C distills all available media down to only the desired media based on a customer's user profile 119. Only the desired media content is offered to the customer. Customers can then peruse their media selections without wading through dozens of unwanted channels. A significant convenience is realized by the customer via this system, which requires less information to be transmitted than currently exists in the prior art. Also contemplated by the reception, distillation, and transmission of media content by video server 118C is the ability to target advertising.

Video server 118C may receive advertising media content from a variety of different advertisers through media content sources 112. Advertising content can then be selectively communicated to a customer based on user profile 119. In this way, the CMCDS 110 enables an advertiser to better target their advertising. For instance, soda pop manufacturers may want to advertise diet drinks only in households where a diet soda drinker resides, which would be made known via user profile 119. Also, a toy company may not want to advertise in households where no children live. Additionally, a customer may want to block certain types of advertising. For instance, a recovering alcoholic may prefer to not receive advertising for alcoholic products. This type of information would be stored in the customers' user profile 119.

Video server 118C can record what media content is sent to receiving devices 114. In one embodiment, the customer is billed only for media content consumed rather than for available media content as is common in the prior art. Also, customers would have the option of changing their user-profile preferences at any time to reflect changes in media preferences.

Video server 118C also receives user input from receiving devices 114. The user input can be recorded. This information can later be used for a variety of purposes, including understanding the customer's viewing habits and preferences. Receiving user input enables video server 118C to offer customized advertising and entertainment far beyond the scope of traditional media distribution systems. For instance, video server 118C includes application programing for rendering games such as trivia games. Video server 118C could also take orders regarding the advertised product. For instance, a local pizza company could target a special deal for customers in its delivery area during the $1^{st}$ quarter of a football game and guarantee delivery by half-time. Customers could then order a pizza through the CMCDS 110. Delivery information would already be stored in user profile 119, further streamlining the process for both producer and consumer.

Video-on-demand is also available through CMCDS 110. A consumer's request for a viewing selection is received by video server 118C from at least one of the receiving devices 114. If video server 118C has already stored the selection, transmission of the selection can begin at the user's request. If not, video server 118C issues a request to various media-content providers for the media selection. Media content providers and producers then communicate the requested content in a fashion similar to that briefly described above and more fully described below. As would be appreciated by one skilled in the relevant art, a video-on-demand system is readily adaptable to assume the role of a pay-per-view system.

Data-entry component 118D populates user-profile database 118A. Data-entry component 118D captures customer information and communicates it to user-profile database 118A. Data-entry component 118D contemplates customer interaction, such as a customer entering user-profile information over the Internet. Data-entry component 118D is also capable of gathering customer information without customer interaction using behavioral data collection and pattern recognition techniques. As would be appreciated by one skilled in the relevant art, data-entry component 118D includes can assume a myriad of forms including a computer, a terminal, a kiosk, a telephony device, a television, a personal data assistant, a consumer electronics device, a speaker, a customer-monitoring application, and a default-settings programming device.

Receiving devices 114 receive media content in a network-compatible protocol and create the appropriate media for the user. A preferred embodiment uses a television and a set-top device. IP packets containing media content are communicated across multicast network 118B to a telephone company's Digital Subscriber Line Access Multiplexer (DSLAM) 114E. The IP packets are communicated across the DSLAM to a customer's set top device. A set top device receives IP packets containing media information and converts the information to a National Television System Committee (NTSC) format that is transmitted to a television or similar device. The set top device receives user input from a remote control and transmits the information to the appropriate PHMS component. In another embodiment, a television 114F capable of receiving IP packets directly would replace the set top and television combination above. FIG. 2 discloses the connections for both embodiments.

The media-rendering system accepts media content in a network-compatible format and allows the media content to be experienced in some form (audio, visual, etc.). Exemplary media-rendering systems include a consumer-electronics device 114A, a telephony device 114B, a computer 114C, a personal communications system 114D, a DSLAM 114E, a television 114F, a tablet computer and a personal data assistant 114G. Here, television 114F is understood to be almost any viewing device including a monitor, High Definition TeleVision (HDTV), plasma screen, and video projector. The preceeding list of suitable media rendering devices is meant to be exemplary in nature and not limiting. Any device capable of rendering media is a suitable end point for media content transmissions. Any device capable of receiving user input is contemplated as suitable for inclusion into the interactive nature of the present invention. As would be apparent to one skilled in the relevant art, many such rendering and receiving devices would require interfacing hardware to enable communication with multicast network 118B. User input is communicated to video server 118C, where it can be processed.

Having described in detail the components of the CMCDS 110, a method for communicating media content to a media-rendering system follows. At a step 310, CMCDS 110 receives media content from one of the many media content sources 112. More specifically, MCRCE 116 receives the media content. Every source included in media-content sources 112 can be converted to a network-compatible format. The various components of MCRCE 116 are used in this conversion process as necessary in a step 312. In a step 314, video server 118C stores the converted media content and selects what media content of the available media content is communicated to a particular customer. This decision is based, in part, on customer information and preferences contained in user profile 119. At a step 316, the filtered media is distributed over multicast network 118B.

Multicast network 118B is capable of transmitting the same media content to multiple destinations with only one transmission stream. For instance, if ten customers want to view the same movie, video server 118C only needs to transmit one media-content stream. The multicast routers that create a multicast network 118B will route the media content to all the destinations supplied by video server 118C. At a step 318, if necessary, the media content is communicated over a local communications network to one of the receiving devices 114. The local communications network could be POTS communication lines, a Local Area Network (LAN), Wide Area Network (WAN), the Internet, or any other medium capable of carrying data. The receiving devices 114 working with other equipment form a media rendering system capable of creating the appropriate form of media. Although 318 is illustrated as a terminating step for simplicity, the media content delivery process is a continuous process.

As can be seen, the present invention and its equivalents are well adapted to provide a new and useful system and method for providing customized media content and advertising via a multicast network. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative systems or methods while maintaining one of the several objectives of the invention, which are not limited to using multicast technology to deliver high-quality media content to a myriad of endpoints, to increase the effectiveness of advertising, to enable new media billing methods, to enable video-on-demand, and to enable interaction with an end user.

It will be understood that certain features and subcombinations are of utility and may be employed without reference to other features and subcombinations and are contemplated within the scope of the claims. Not all steps listed in the various figures need be carried out in the specific order described.

What the invention claimed is:

1. A method for providing customized media service, the method comprising:

receiving media content from a content provider;

converting the media content into an Internet-usable format;

selectively limiting access to the converted media content based on a user profile, wherein the user profile is stored in a user-profiles database, the user profile comprising television channel preferences, customer information, and account activity, specifying media to which a user is entitled, and including user preferences for blocking certain types of advertisements;

determining at least one receiving device from among a plurality of receiving devices associated with a user to deliver the selectively-limited, converted media content to the user based upon information stored in the user profile, wherein the plurality of receiving devices comprises at least one digital subscriber line access multiplexer (DSLAM);

delivering only the selectively-limited, converted media content to the at least one receiving device;

logging the delivered, selectively-limited, converted media content for billing purposes; and billing the user for only channels matching user preferences stored in the user profile instead of a predetermined set of channels specified by a service provider.

2. The method of claim 1, wherein the user profile is associated with a group of people.

3. The method of claim 1, wherein the user profile includes television channel preferences that set channels to appear in a user-specified order.

4. The method of claim 1, wherein selectively limiting access to the converted media content includes receiving a plurality of media preferences to populate the user profile, the media preferences include a selection from the group comprising:

channel preferences, language preferences, genre preferences, service-duration preferences, and format preferences.

5. The method of claim 4, wherein receiving the plurality of media preferences includes receiving data from a data-entry component.

6. The method of claim 5, wherein the data-entry component comprises at least one of the following: a computer, a terminal, computer executable code that monitors and reports user activity, a kiosk, a web site, a telephone, a television, a speaker, and a default-settings programming device.

7. The method of claim 6, further comprising storing the user profile in a computer-readable medium.

8. The method of claim 1, wherein delivering the selectively-limited, converted media content includes communicating the converted media content to the receiving device over a multicast network.

9. The method of claim 8, wherein delivering the selectively-limited, converted media content further includes communicating the converted media content to the receiving device over a communications network operationally coupled to the multicast network.

10. The method of claim 9, wherein the communications network includes a telephone-service network.

11. The method of claim 1, wherein the plurality of receiving devices further comprises at least one of the following: a television, a set-top box, a personal data assistant, a personal communications system, a telephony device, a consumer-electronics device, and a computer.

12. The method of claim 1, further comprising providing for the reception of user input via one of the plurality of receiving devices.

13. The method of claim 12, wherein the user input comprises at least one of the following: transaction information, the media preferences, presentation preferences, an information request, a menu-navigation selection, a message, and purchasing information; wherein said presentation preferences comprise channel line-up preferences.

14. The method of claim 12, further comprising delivering customized advertising content to the receiving device based on the user input.

15. The method of claim 1, further comprising providing video-on-demand via the multicast network.

16. A non-transitory, tangible computer-storage medium containing computer-usable instructions embodied thereon that when executed by a processor, causes the processor to:

receive media content in an Internet-usable format from a media content source;

reference a user-profiles database to customize the media content, wherein the user profiles database comprises user profiles that comprise television channel preferences, customer information and account activity, specify media to which users are entitled, and include user preferences for blocking certain types of advertisements;

determine a receiving device from among a plurality of receiving devices associated with a user to which customized content is to be delivered, the receiving device being determined based upon information stored in the user profile, wherein the plurality of receiving devices comprises at least one digital subscriber line access multiplexer (DSLAM);

communicate only a portion of the media content based on the user-profiles database to the determined receiving device;

log the portion of the media content for billing purposes; and bill the user for only channels matching user preferences stored in the user profile instead of a predetermined set of channels specified by a service provider.

17. The non-transitory, tangible computer-storage medium of claim 16, wherein the Internet-usable format includes a format adhering to an Internet-networking protocol.

18. The non-transitory, tangible computer-storage medium of claim 16, wherein the user-profiles database contains media preferences comprising at least one of the following: television-channel preferences, language preferences, genre preferences, service-duration preferences, viewing preferences, topic preferences, ratings preferences, actor preferences, style preferences, era preferences, artist preferences, protocol preferences, and format preferences.

19. A system for providing media service, the system comprising:

a media-content conditioning component (MCCC) for receiving raw media content and converting the raw media content into an Internet-usable format;

a user-profiles database coupled to the MCCC, wherein the user profiles database comprises user profiles that comprise television channel preferences, customer information and account activity, specify media to which users are entitled, and include user preferences for blocking certain types of advertisements;

a video server operationally coupled to the user-profiles database for communicating with the user-profiles database, for receiving and storing the converted media content, and for selectively limiting access to the converted media content, wherein the user is billed for only channels matching user preferences stored in the user profile instead of a predetermined set of channels specified by a service provider;

a multicast network operationally coupled to the video server for delivering only the selectively-limited, converted media content to and communicating with at least one receiving device from among a plurality of receiving devices associated with a user, the at least one receiving device determined based upon information stored in the user profile, wherein the plurality of receiving devices comprises a digital subscriber line access multiplexer (DSLAM).

20. The system of claim 19, wherein the MCCC includes a decryptor.

21. The system of claim 20, wherein the MCCC includes a demodulator operationally coupled to the decryptor.

22. The system of claim 21, wherein the MCCC includes a transrater operationally coupled to the demodulator.

23. The system of claim 19, wherein the Internet-usable format includes a format adhering to an Internet-networking protocol.

24. The system of claim 19, wherein the selectively limiting access to the converted media content includes receiving a plurality of media preferences to populate a user profile in the user-profiles database.

25. The system of claim 24, wherein the plurality of media preferences include a selection from the group comprising: television-channel preferences, language preferences, genre preferences, service-duration preferences, viewing preferences, topic preferences, ratings preferences, actor preferences, style preferences, era preferences, artist preferences, protocol preferences, and format preferences.

26. The system of claim 24, wherein receiving the plurality of media preferences includes receiving data from a data-entry component.

27. The system of claim 26, wherein the data-entry component comprises at least one of the following: a computer, a terminal, computer executable code that monitors and reports user activity, a kiosk, a telephone, a television, a speaker, a consumer-electronics device, and a default-settings programming device.

28. The system of claim 19, further comprising a receiving device operationally coupled to the multicast network.

29. The system of claim 28, wherein the receiving device comprises at least one of the following: a television, a display device, a personal data assistant, a personal communications system, a telephony device, a consumer-electronics device, and a computer.

30. The system of claim 19, further comprising a communications network operationally coupled to the multicast network.

31. The system of claim 30, wherein the communications network includes a telephone-service network.

* * * * *